(12) United States Patent
Bouillet et al.

(10) Patent No.: US 8,799,294 B2
(45) Date of Patent: Aug. 5, 2014

(54) METHOD FOR ENHANCING SEARCH AND BROWSING IN COLLABORATIVE TAGGING SYSTEMS THROUGH LEARNED TAG HIERARCHIES

(75) Inventors: Eric Bouillet, Englewood, NJ (US); Zhen Liu, Tarrytown, NY (US); Anand Ranganathan, Stamford, CT (US); Anton Riabov, Ossining, NY (US)

(73) Assignee: International Business Machines Corporation, Armonk, NY (US)

( * ) Notice: Subject to any disclaimer, the term of this patent is extended or adjusted under 35 U.S.C. 154(b) by 789 days.

(21) Appl. No.: 12/120,663

(22) Filed: May 15, 2008

(65) Prior Publication Data

US 2009/0287674 A1 Nov. 19, 2009

(51) Int. Cl.
 *G06F 7/00* (2006.01)
 *G06F 17/30* (2006.01)
(52) U.S. Cl.
 USPC ............ 707/748; 707/752; 707/758; 707/769
(58) Field of Classification Search
 USPC ......... 707/816, 817, 706, 707, 770, 721, 748, 707/759, 781, 608, 713, 728, 736, 737, 741, 707/752, 758, 769, 776, 796; 704/4, 9, 236, 704/243; 712/26; 709/203, 217, 223, 231; 715/234, 738, 854, 754, 745; 705/321
 See application file for complete search history.

(56) References Cited

U.S. PATENT DOCUMENTS

| 7,685,198 B2* | 3/2010 | Xu et al. | 707/748 |
|---|---|---|---|
| 7,685,200 B2* | 3/2010 | Gunawardena et al. | 707/748 |
| 7,836,028 B1* | 11/2010 | Agarwal et al. | 707/695 |
| 8,200,517 B2* | 6/2012 | Sakamoto et al. | 705/7.11 |
| 2002/0091696 A1* | 7/2002 | Craft et al. | 707/10 |
| 2006/0087407 A1* | 4/2006 | Stewart et al. | 340/10.52 |
| 2008/0059897 A1* | 3/2008 | Dilorenzo | 715/764 |
| 2008/0114573 A1* | 5/2008 | Hsieh et al. | 703/2 |
| 2008/0114644 A1* | 5/2008 | Frank et al. | 705/14 |
| 2008/0120346 A1* | 5/2008 | Neogi et al. | 707/200 |
| 2009/0112859 A1* | 4/2009 | Dehlinger | 707/6 |
| 2009/0164584 A1* | 6/2009 | Szetu et al. | 709/205 |
| 2009/0240692 A1* | 9/2009 | Barton et al. | 707/5 |

OTHER PUBLICATIONS

Marchetti et al. "SemKey: A Semantic Collaborative Tagging System" CNR Technical Report WWW 2007, May 8-12, 2007 Banff, Canada.*

(Continued)

*Primary Examiner* — Sherief Badawi
*Assistant Examiner* — Berhanu Mitiku
(74) *Attorney, Agent, or Firm* — George Willinghan; August Law, LLC (57) ABSTRACT

A number of Web 2.0 sites support collaborative tagging systems, which allow users to tag resources with keywords. The tags enable search and retrieval of resources both for the user and for other users, using interfaces like a conventional search form or a tag cloud. A tag hierarchy-based search and retrieval system is provided that enhances the existing interfaces by improving search recall and allowing the discovery of even poorly annotated resources. The system uses tag co-occurrence information to automatically learn tag hierarchies. The learned hierarchies are used for automatically inferring additional tags to resources. These inferences are used to improve the recall of queries issued from a search form or via a tag cloud. The learned hierarchies can be viewed as an emergent ontology that is built up through the collaborative wisdom of a large number of users.

21 Claims, 4 Drawing Sheets

(56) References Cited

OTHER PUBLICATIONS

Li et al. "Towards Effective Browsing of Large Scale Social Annotations" International World Wide Web Conference Committee (IW3C2). WWW 2007, May 8-12, 2007, Banff, Alberta, Canada.*

Glahn et al. "Implications of Writing, Reading, and Tagging on the Web for Reflection Support in Informall Learning" OTEC, Open University of the Netherlands, Valkenburger Weg 177, 6419AT Heerlen, The Netherlands P. Dillenbourg and M. Specht (Eds.): EC-TEL 2008, LNCS 5192, pp. 110-121, 2008 Springer-Verlag Berlin Heidelberg 2008.*

Golder, S. and Huberman B., The Structure of Collaborative Tagging Systems, Technical Report, HP Labs, 2006.

Halpin, H., Robu, V. and Shepherd, H, The Complex Dynamics of Collaborative Tagging, WWW 2007.

Mika, P, Ontologies Are Us: A Unified Model of Social Networks and Semantics, ISWC 2005.

Hotho, A., Jaschke, R., Schmitz, C and Stumme, Information Retrieval in Folksonomies: Search and Ranking, ESWC. 2006.

Li, R., Bao, S., Fei, B., Su, Z. and Yu, Y, Towards Effective Browsing of Large Scale Social Annotations, WWW, 2007.

Zhou, M., Bao, S., Wu, X. and Yu, Y., An Unsupervised Model for Exploring Hierarchical Semantics from Social Annotations, ISWC 2007.

Tanaka, J., and Taylor, M., Object Categories and Expertise: Is the Basic Level in the Eye of the Beholder?, Cognitive Psychology 23(3):457-482 (1991).

Colder and Huberman, Colder, S. and Huberman, B., The Structure of Collaborative Tagging Systems, Technical Report, HP Labs (2006).

\* cited by examiner

METHOD FOR ENHANCING SEARCH AND BROWSING IN COLLABORATIVE TAGGING SYSTEMS THROUGH LEARNED TAG HIERARCHIES

STATEMENT REGARDING FEDERALLY SPONSORED RESEARCH

The invention disclosed herein was made with U.S. Government support under Contract No. H98230-07-C-0383. The Government has certain rights in this invention.

FIELD OF THE INVENTION

The present invention relates to collaborative tagging systems.

BACKGROUND OF THE INVENTION

Collaborative tagging systems or folksonomies have emerged as a popular way of annotating and categorizing content using a set of tags that are created and managed collaboratively. A number of Web 2.0 applications like del.icio.us, Flickr, Connotea, Technorati and YouTube allow users to "tag" resources to facilitate search and retrieval both for the user and for other users. The appeal of folksonomies comes from the fact that they are community-generated and require less effort for creation and maintenance. This is in contrast to ontologies, which are often created by a small number of experts and are more consistent, but also relatively static and inflexible.

Two common search and navigation interfaces provided by many collaborative tagging systems are the search form and the tag cloud. A search form allows users to enter one or more tags in a text box, and the result of the search is typically a ranked list of resources that have been annotated by these tags. A tag cloud is a visual representation of a list of tags that uses visual cues like color or font size to depict the weights of tags. These search and navigation interfaces provide a means for users to discover resources without having to be aware beforehand of the set of tags used in describing the resources.

Conventional tagging systems exhibit poor scaling with increasing numbers of tags. Poor scaling results from limited screen real estate and the difficulty presented to users by browsing through long lists of tags. As a result, most tag clouds have a fixed number of tags, and only the most popular or highest weighted tags are displayed to the user. This limitation results in most resources being inaccessible from the tag cloud, since these resources may have been tagged by other tags which do not appear in the tag cloud. This problem is exacerbated by the fact that tagging of resources follows a long tail distribution, as described in Golder, S. and Huberman B., *The Structure of Collaborative Tagging Systems*, Technical Report, HP Labs, 2006. In long tail distribution, a few popular tags are used frequently, and the majority of the resources are annotated with low frequency tags. Hence, the tag cloud interface provides very low recall, where only a very small portion of the resources are accessible to the user.

A number of previous works have analyzed the tags from Web 2.0 sites, for example, del.icio.us, to determine various properties of these tags. Colder and Huberman discovered patterns in tagging dynamics in del.icio.us. They found that the majority of URLs reach their peak popularity, the highest frequency of tagging in a given time period, within 10 days of being saved on del.icio.us (67% in the data set of Colder and Huberman) though some sites are rediscovered by users (about 17% in their data set). This indicates stability of the tags for most sites, with some degree of burstiness. In addition, the proportion of frequencies of tags assigned to a given URL stabilizes over time. After the first 100 or so bookmarks, each tag's frequency is a nearly fixed proportion of the total frequency of all tags used.

In Halpin, H., Robu, V. and Shepherd, H, *The Complex Dynamics of Collaborative Tagging*, WWW 2007, a generative model of collaborative tagging is produced to explain the dynamics of the frequency distribution of tags for popular sites with a long history, i.e., with many users and many tags. According to the model and experiments, the frequency distribution of tags follows a power law. In Mika, P, *Ontologies Are Us: A Unified Model of Social Networks and Semantics*, ISWC 2005, a model of semantic-social networks is defined for extracting lightweight ontologies from del.icio.us. Besides calculating measures like the clustering coefficient and (local) betweeness centrality, Mika uses a symmetric distance measure for clustering the concept network.

In Hotho, A., Jaschke, R., Schmitz, C and Stumme, *Information Retrieval in Folksonomies: Search and Ranking*, ESWC. 2006, a new search algorithm for folksonomies is proposed, called FolkRank, which ranks tags using an adapted version of PageRank on a graphical representation of the tags in a folksonomy, while taking into account a user's preferences as extracted from the query. In Li, R., Bao, S., Fei, B., Su, Z. and Yu, Y, *Towards Effective Browsing of Large Scale Social Annotations*, WWW, 2007, an algorithm is described for allowing users to browse social annotation data in a hierarchical and semantic manner. In Zhou, M., Bao, S., Wu, X. and Yu, Y., An *Unsupervised Model for Exploring Hierarchical Semantics from Social Annotations*, ISWC 2007, an approach for learning hierarchical semantics from del.icio.us annotations is described.

SUMMARY OF THE INVENTION

Systems and methods in accordance with the present invention enhance the conventional search and navigation interfaces with the aid of tag hierarchies. The tag hierarchies, which in one embodiment are directed acyclic graphs, are based on a "sub-tag" relationship between tags. The sub-tag relationship has associative semantics, i.e., a sub-tag is commonly associated with its parent tags in resource annotations. In this manner, the sub-tag relationship is different from a subclass or subsumption relationship commonly found in Semantic Web ontologies. The tag hierarchies of the present invention are used to automatically infer additional tags for resources.

Suitable tag hierarchies include user-defined, learned and a combination of user-defined and learned hierarchies. Due to the vast space of possible tags, at least a portion of the tag hierarchy is preferably learned automatically. In one embodiment, an unsupervised learning algorithm is used that learns sub-tag relationships based on tag co-occurance statistics. Using folksonomies to learn tag hierarchies assists in discovering emergent semantics from tag usage patterns, bridging the gap between folksonomies and formal taxonomies or ontologies. These emergent taxonomies retain the advantages of folksonomies, because the emergent taxonomies are community-generated and are easier to create and to maintain than conventional taxonomies.

Inferences based on the sub-tag relationship tackle a common problem in folksonomies where different users use tags at different levels of specificity when they annotate resources. Therefore, the learned hierarchies improve search recall by allowing users to discover resources, which have been tagged by specific tags, using general search terms. In addition, the inferences help to improve the discoverability of poorly annotated resources by increasing the number of tags with which the poorly annotated resources are associated. The use of tag hierarchies also overcomes a key limitation of tag clouds, poor scaling with increasing numbers of tags.

In order to overcome the limitations of the conventional tag-cloud, the present invention utilizes two approaches for improving the coverage of the tag cloud. These approaches use the tag hierarchies to select the tags to be displayed in the tag cloud so as to maximize recall.

In one exemplary embodiment of the present invention, a method for improving search and retrieval of resources in a collaborative tagging system is provided that includes identifying relationships among a plurality of tags. The plurality of tags have been associated by a plurality of users with a plurality of resources. In one embodiment, the relationships are identified between selected pairs of tags, and a conditional probability is calculated for each pair of tags. The conditional probability is a probability that if a first tag in a given pair of tags has been used to tag a given resource, a second tag in the given pair of tags has also been used to tag that resource. In one embodiment, a ratio, for each pair of tags, of the number of resources tagged by both first and second tags in a given pair to the number of resources tagged by the second tag in the given pair is determined. In addition, a threshold value for the conditional probability is defined, and, for those given pairs having a conditional probability greater than the identified threshold value, the first tag is identified as a sub-tag of the second tag.

The identified tag relationships are used to create a hierarchy of tags. This hierarchy of tags can be a directed graph, for example, a directed acyclic graph, having a plurality of nodes, each node comprising one of the plurality of tags, and a plurality of edges, each edge comprising one of the identified tag relationships. In addition, cycles in the directed graph can be identified, and all nodes in each identified cycle are collapsed into a single node.

The created hierarchy is used to increase the total number of resources uncovered by a tag-based search of the plurality of resources. In one embodiment, for a given resource having a given associated tag, all super tags in the created hierarchy of the given tag as assigned to the given resource. Alternatively, the tag hierarchy is used to infer additional tags as search terms in the tag-based search. In one embodiment, the created hierarchy is used to maximize the recall of a tag cloud containing a plurality of tags. In one embodiment, the tag hierarchies are used to include inferred tags in the description of each one of the plurality of resources, increasing the weight of top level tags in the hierarchy and removing lower level tags from the tag cloud.

In one embodiment, root tags in the created hierarchy are selected to be included in the tag cloud. In addition, the most popular non-root tags to be included in the tag cloud after including all the root tags. In one embodiment, the tag cloud is constructed as a set cover-based tag cloud by iteratively selecting an existing tag comprising a largest resource coverage and removing that existing tag and the covered resources from consideration until a total number of selected tags equals a fixed maximum size of the tag cloud.

DETAILED DESCRIPTION

Exemplary embodiments of systems and methods in accordance with the present invention utilize a model of tag hierarchies based on sub-tag relationships in folksonomies. In one embodiment, a tag hierarchy-learning algorithm is utilized. The tag hierarchy learning algorithm uses tag co-occurrence statistics to discover sub-tag relationships in addition to an analysis of the learned hierarchies. The learned tag hierarchies are used to improve search and retrieval of resources.

In accordance with one embodiment, a tag model is extended to represent hierarchies of tags. The tag model uses a tripartite model of collaborative tagging systems. The three main entities in a tagging system are the users, $U=\{u_1, u_2, \ldots, u_k\}$, the tags $T=\{t_1, t_2, \ldots, t_k\}$ and the resources $R=\{r_1, r_2, \ldots, r_k\}$. Suitable resources include, but are not limited to, web pages, data files, data streams, bookmarks, e.g., del.icio.us, images, e.g., Flickr and videos, e.g., YouTube. Users annotate the resources with tags, creating ternary associations among the user, the tag and the resource. The folksonomy is defined by a set of annotations $A \subseteq U \times T \times R$. Each annotation can be considered to be a hyperedge in a graph where the nodes are the users, tags and resources, and where the hyperedge represents the fact that a given user associated a certain resource with a certain tag. Hence, the folksonomy can be represented as a hypergaph, $\Gamma=(V, E)$, where $V=U \cup T \cup R$ and $E=\{(u,t,r) | (u,t,r) \in A\}$.

In the case of social bookmarking sites, e.g., del.icio.us, an additional entity is a bookmark. A bookmark includes the set of tags assigned by a user for a given uniform resource locator (URL). The set of bookmarks is $B \subseteq T$ where $B=\{b_{u,r}\}$ such that $b_{u,r}=\{t | (u,t,r) \in A\}$ A tag hierarchy, H, is a directed acyclic graph (DAG) where the vertices are the tags, and the edges represent "sub-tag" relationships. The tag hierarchy is defined as $H=(T, S)$, where T is the set of tags and $S \subseteq T \times T$ is the set of sub-tag relationships. As used herein, a sub-tag differs from a conventional "subclass" or subsumption relationship in Semantic Web ontologies. A sub-tag has associative semantics. For example, if x is a sub-tag of y (or $x \prec y$), then x is commonly associated with y by the community of users. In other words, if a given resource is tagged with x, there is a high probability that the same resource is also tagged with y. As used herein, the symbol $\prec$ represents sub-tag relationships.

Sub-tags can represent different kinds of relationships. Common sub-tag relationships include, but are not limited to, synonyms, e.g., films $\prec$ movies, different inflections of the word (based on number, tense or gender), e.g., movie $\prec$ movies, is-a relationships, e.g., documentaries $\prec$ movies, instance-of relationships, e.g., SIMPSONS $\prec$ movies, translations in different languages, e.g., peliculas $\prec$ movies, part-of relationships, e.g., screenplays $\prec$ movies, abbreviations, e.g., mov $\prec$ movies, sources, e.g., imdb $\prec$ movies and located-in relationships, e.g., Stockholm $\prec$ Sweden. In addition to these general relationships, tag-specific relationships can be discovered as sub-tags. For example, in the case of movies, file formats like wmv and mpeg, and media like DVDs, are also sub-tags of movies.

Since the sub-tag relationship is defined based on associative semantics, any resource that has a tag, t, can be automatically assigned all the super-tags of t. In other words, $(((u,t,r) \in A) \wedge (t \Rightarrow v)) \Rightarrow ((u,v,r) \in A)$. In addition, the sub-tag relationship is transitive, i.e., $(x \wedge y) \prec (y \prec z) \prec (x \prec z)$.

Exemplary embodiments of systems and methods in accordance with the present invention infer additional tags to resources, preferably automatically. One characteristic of tagging systems is that a resource may be tagged by terms that vary along a continuum of specificity from very general to very specific. For example, a site providing a tutorial on enterprise Java beans may be tagged by ejb, Java or programming. The choice of tag used often depends on what a given user considers to be the most useful or appropriate for the resource in question. This in turn depends on the expertise level of the user. Experiments by Tanaka and Taylor, Tanaka, J., and Taylor, M., *Object Categories and Expertise: Is the Basic Level in the Eye of the Beholder?*, Cognitive Psychology 23(3):457-482 (1991), show that different users have different "basic levels" at which they associate words with entities. In these experiments, when subjects were asked to identify dogs and birds, many of them used terms like dog and bird rather than more general terms like "mammal" or "animal", or more specific terms like beagle or robin. However, some experts used the more specific terms. For example, a dog expert might consider beagle a basic level, and a bird expert might use the tag robin.

Different people may use more specific or more general tags to describe the same resource depending on their expertise, their needs and other factors like their social and cultural contexts. In collaborative tag clouds, such differences in tagging behavior may result in certain resources not being tagged with all the relevant tags. However, with the aid of reasoning based on tag hierarchies, more general tags are assigned to resources. Assigning additional tags to resources based on the tag hierarchies improves search recall by allowing people to access resources that may have only been tagged using very specific terms by experts.

In one embodiment, the tag hierarchies are learned by discovering sub-tag relationships between tags based on co-occurrence relationships, i.e. based on how often these tags are used to describe the same resource relative to how often the tags are used overall. In one embodiment of learning the tag hierarchies, only the tag-resource portion of the folksonomies are considered. The tags and resources can be described as a bipartite graph, $G=(V, E)$, where $V=T \cup R$ and $E=\{(t,r) | \exists u \; (u,t,r) \in A\}$. Prior to learning the tag hierarchies, the data are cleaned to only keep those resources and tags that have been used by a sufficiently large number of users. Colder and Huberman, Colder, S. and Huberman, B., *The Structure of Collaborative Tagging Systems*, Technical Report, HP Labs (2006), found that the relative tag frequencies of a resource (URL in the case of del.icio.us) become stable after the first 100 or so bookmarks. Therefore, in one embodiment resources that have been bookmarked at least 100 times are considered. In addition, only tags used by at least a certain number of users, preferably 75, are considered.

Cleaning yields a reduced sets of tags and resources, called T* and R* respectively. Using the reduced, cleaned sets of tags and resources, the conditional probability distributions on all pairs of tags are calculated. For every pair of tags, $t_1$ and $t_2$, the conditional probability that $t_1$ is used to tag the resource given that $t_2$ has been used to tag that resource is calculated. In one embodiment, this conditional probability is calculated based on the graph, G, as follows:

$$\phi_G(t_1, t_2) = P((t_1, r) \in E \mid (t_2, r) \in E)$$
$$= \frac{R(t_1 \wedge t_2)}{R(t_2)}$$

where $R(t_1 \wedge t_2)$ represents the number of resources that are tagged with both $t_1$ and $t_2$, and $R(t_2)$ represents the number of resources which are tagged with $t_2$.

The conditional probability, $\phi(t_1, t_2)$, gives an indication of how strongly $t_1$ is associated with $t_2$. In the present invention, if $\phi(t_1, t_2) > \theta$, where $\theta$ is a threshold that can be configured, then it is inferred that $t_1 \prec t_2$. Assigning different values to $\theta$ yields different tag hierarchies with different sizes, i.e., hierarchies with different depths and breadths, and different qualities. The conditional probability is an asymmetric measure for calculating asymmetric sub-tag relationships.

Figure 1:
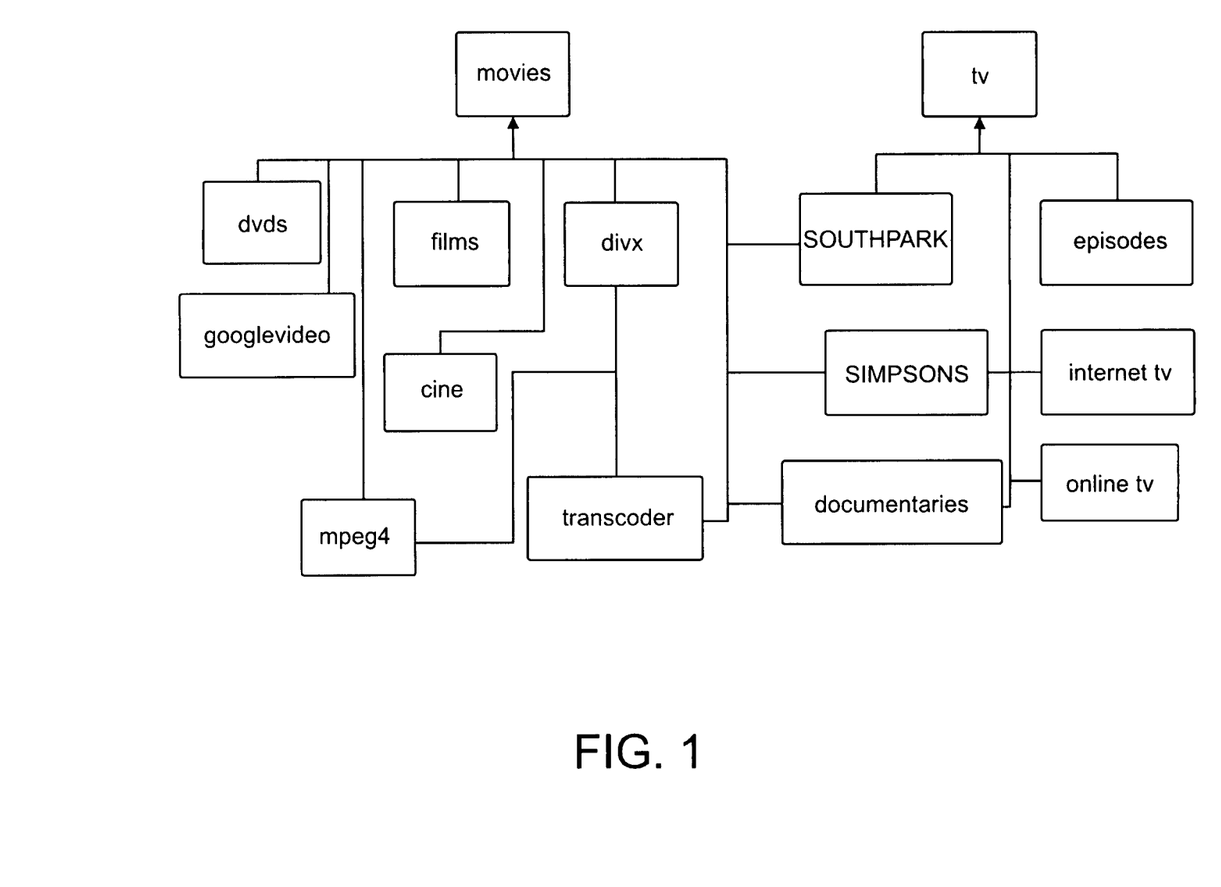
FIG. 1 is a schematic representation of an embodiment of a tag hierarchy for use in accordance with the present invention.

Based on the sub-tag relationship, a hierarchy of tags is created. Initially, a directed graph of tags is created having edges that correspond to the sub-tag relationship. All cycles are identified. A cycle implies the existence of synonyms. For each given cycle, all the nodes in the cycle are collapsed into a single node. The resulting graph is a directed acyclic graph that represents the tag hierarchy. Referring to FIG. 1, an exemplary embodiment of a portion of the learned hierarchy is illustrated. As illustrated, the conditional probability threshold is set to 0.7.

In one embodiment, the created hierarchy of tags is used to provide improvements in searching and browsing. The two key main interfaces supported by most collaborative tagging sites are the search form and the tag cloud. The search form allows the user to search for matching resources by entering a set of tags. The tag cloud, including tag clouds enhanced with drill clouds navigation, simplifies exploration of resources by selecting tags. In one embodiment, the tag hierarchies, either learned or manually defined, are used to enhance both types of interfaces.

Incorporating inferences based on the tag hierarchy helps in improving the search results in two ways. First, the search recall improves since additional results may be returned as a result of the inferences. Secondly, it improves the "discoverability" of less popular resources. In the del.icio.us dataset, for example, a significant fraction of the resources have only a few tags, i.e., less than 10 tags. In many cases, these resources have recently been added to the system and have not been tagged by many users as yet. The inferences based on the tag hierarchy improve discoverability by increasing the number of tags associated with each resource.

In one embodiment, the tag hierarchies are used to improve tag clouds. For example, a tag cloud has a fixed maximum size, c. In addition, the size of the set of all tags is n, c<n. A total of c tags are picked out of the total of n tags to be included in the cloud. To enable efficient exploration of resources, it is desirable to ensure that as many resources as possible can be reached by searching for tags included in the cloud. This becomes even more important in drill clouds. A drill cloud uses an iterative tag selection process, where each time a user selects a tag in a tag cloud, that user is presented with results based on the current selection of tags. In addition, the user is presented with a new tag cloud that is customized based on the current context of the navigation, i.e., the current set of tags selected. The conventional method of including most popular tags in the tag cloud does not provide good coverage of resources during such exploration, hiding resources annotated with less popular tags.

One metric that is useful in evaluating the quality of a tag cloud is the recall. Recall is defined as the number of resources that can be reached by selecting one of the tags in the tag cloud. Consider a bipartite graph of tags and resources, $G=(V,E)$, where $V=T\cup R$ and $E=\{(t,r)|$tag t is used to annotate resourcer$\}$. Consider a tag cloud, $T=t_1, t_2, \ldots, t_n$ with n tags. The coverage of a tag cloud, cov(T), is defined as the set of resources that are covered by the tag cloud.

$$cov(T)=\{r|\exists t\epsilon T,(t,r)\epsilon E\}$$

Then, the recall of a tag cloud, rec(T)=|cov(T)|. In general, tag hierarchies, either learned or manually defined, aid in tag cloud recall maximization.

Most tag clouds show the highest weighted tags. The simplest method of improving a tag cloud is to make use of inferences based on the tag hierarchies and to include inferred tags in the description of each resource. As a result of the inferences, general tags, at the top of levels of the hierarchies get a higher weight than before. Therefore, the tags at the lower levels of the hierarchies are pushed out of or removed from the tag cloud. As a result, the recall of the cloud is improved, since the resources covered by lower level tags are already covered by top-level tags with higher weight. Resource description or tag clouds can be updated in accordance with the present invention without significant modification. In one embodiment, the resources are annotated with inferred tags.

A modification of the tag cloud hierarchy-based inferencing method can be applied directly to the original set of resources without inferencing. This modified method also contributes to recall improvements. The learned hierarchy, which is a directed acyclic graph, is typically in the form of a set of connected components. Each component has a set of roots. Instead of selecting the most popular tags in the tag cloud from all tags, the most popular tags from among the roots are selected to maximize recall. For example, there are k root tags across the different connected components. If k≪c, all the root tags are selected to be part of the tag cloud, and the c−k most popular non-root tags are added. If k>c, the c most popular roots are chosen to form the roots-based tag cloud. This approach does not use hierarchy-based inferencing and provides recall improvements without potential reduction in precision.

Another method is the set cover-based tag cloud. The general problem of selecting the tags that maximize recall is NP-Hard, based on a reduction to the set cover problem. The greedy approximation to the set cover problem is used in order to construct the set cover-based tag cloud. Initially, the tag with the greatest coverage is selected and removed from consideration. In addition, all the resources it covers are removed from the resource set. Then the most popular tag on the remaining set of resources is selected. This process is repeated until c tags have been selected. When hierarchy-based inferences are taken into account, all tags picked by this algorithm are roots in the hierarchies. Unlike previous approaches, this approach evaluates differences between hierarchy fragments that are not directly related, and hence can achieve better results. However, it is more computationally intensive.

Figure 3:
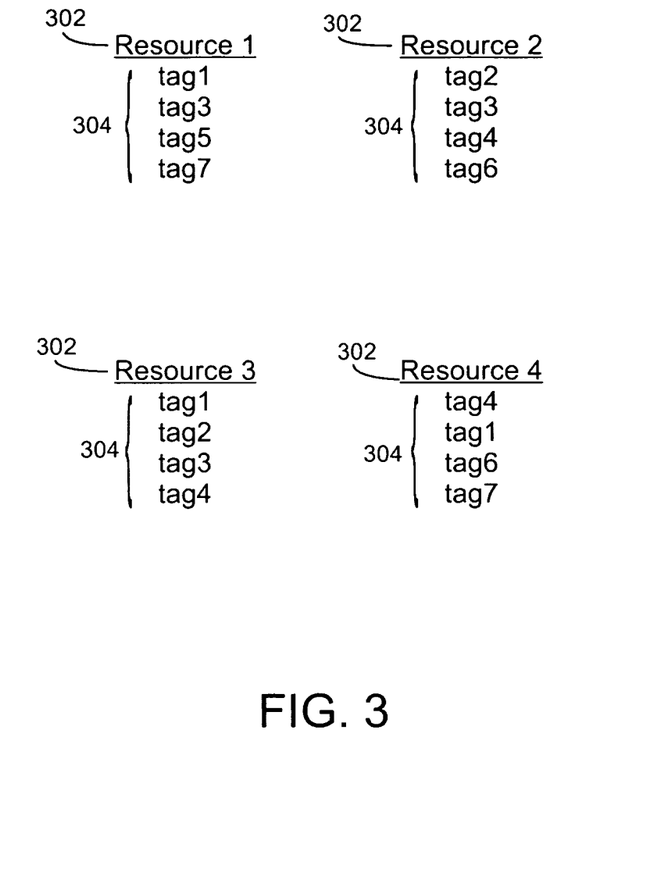
FIG. 3 is an illustration of various resources and the associated tags for use in exemplary embodiments of the present invention.

In accordance with one exemplary embodiment, the present invention is directed to a method for improving the number of resources uncovered during a tag-based search and retrieval of resources in a collaborative tagging system. Referring to FIG. 3, a plurality of resources 302 are illustrated, and each resource includes a plurality of tags 304 that have been associated with each resource by one or more of a plurality of users. In one embodiment, relationships among a plurality of tags are identified using associations with common resources, i.e., tags that are associated with one or more of the same resources. These relationships are referred to as sub-tag relationships, because one tag can be viewed as a sub-tag of another tag. In one embodiment, the relationships are identified between pairs of tags selected from the plurality of tags, and a conditional probability is identified for each selected pair.

The conditional probability is a probability that if a first tag in a given pair of tags has been used to tag a given resource, a second tag in the given pair of tags has also been used to tag that resource. In one embodiment, a ratio is determined for each pair of tags that is the number of resources tagged by both first and second tags in a given pair to a number of resources tagged by the second tag in the given pair. As illustrated in FIG. 3, if the given pair is tag3 and tag4, the number of resources tagged by both is 2, Resource 2 and Resource 3, and the number of resources tagged by the second tag, tag4, is 3. This yields a ratio of ⅔ or 0.67. This ratio is the conditional probability. In order to determine if the conditional probability is sufficient to establish a sub-tag relationship, a threshold value for the conditional probability is identified, for example, 0.6, 0.7 or 0.8. This threshold value can be varied or changed over time. For those given pairs having a conditional probability greater than the identified threshold value, the first tag is a sub-tag of the second tag. As illustrated, for a threshold of 0.6, the tag3 is a sub-tag of tag4.

Figure 4:
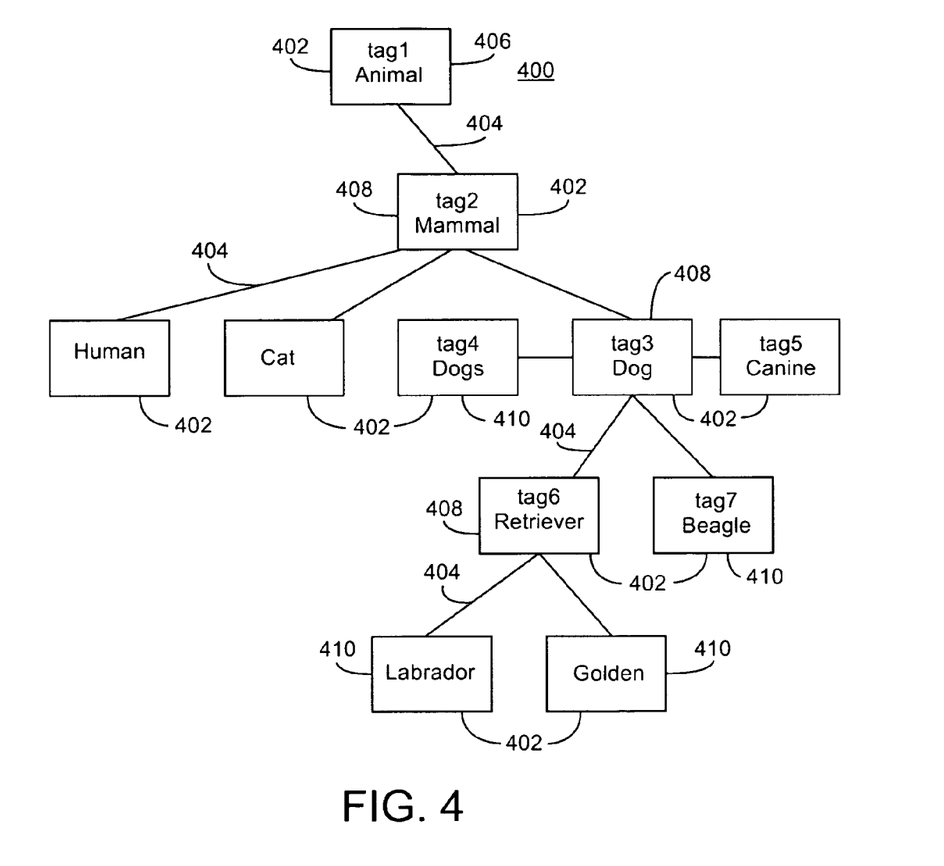
FIG. 4 is an embodiment of a tag hierarchy for use in accordance with the present invention.

Although illustrated with just four resources, significantly larger numbers of resources with tagged sets can be used. In addition, the number of tags or maximum number of tags illustrated for each tag is four; however, larger numbers of tags can be associated with each resource, and the number of tags can vary among the resources. All of the resources and the associated tag sets are used to determine all inter-tag relationships. These relationships are used to construct a tag hierarchy 400 as illustrated in FIG. 4. As illustrated, the resources and tags relate to the classification of animals. In one embodiment, the hierarchy of tags is a directed graph, preferably a directed acyclic graph. The directed graph includes a plurality of nodes 402 where each node is one of the plurality of tags and a plurality of edges 404 where each edge is one of the identified tag relationships. As illustrated, the graph includes a root node 406 as well as higher level intermediate nodes 408 and leaf nodes 410. In one embodiment, cycles in the directed graph are identified, and all nodes in each identified cycle are collapsed into a single node.

Having created the hierarchy, the created hierarchy is used to increase the total number of resources uncovered by a tag-based search of the plurality of resources. For a search of resources based on the tag beagle, using the search terms dog, mammal or animal would yield a larger number of resources. In one embodiment, for a given resource having a given associated tag, all super tags, or parent nodes, in the created hierarchy of the given tag are assigned to the given resource. For example, for Resource 4 (FIG. 3) tag1, tag2 and tag3 are added or included in the description of Resource 4. If the maximum number of tags permitted for that recourse is exceeded, the inclusion of super tags may require the removal of lower level tags, e.g., tag6. In general, the created hierarchy is used to infer additional tags as search terms in the tag-based search. In one embodiment, inferred tags are included in the description of each one of the plurality of resources, which increases the weight of top level tags in the hierarchy. The lower level tags are removed, for example from a tag cloud or resource description, as needed.

The search can be conducted using a search form where users enter one or more tags in a text box, and the result is a ranked list of resources that have been annotated by the entered tags. The hierarchy can be used to enhance the tags entered in the text box or the tags associated with the resources. The search can also be conducted using a tag cloud. Suitable types and formats of tag clouds are known and available to one of skill in the art. In general, the tag cloud provides a visual representation of a list of tags and uses visual cues such as color and font changes to depict the weights of the displayed tags. Tag clouds allow users to discover resources without having to be aware beforehand of the sent of tags. In one embodiment, the created hierarchy is used to maximize the recall of a tag cloud containing a plurality of the tags. In one embodiment, root tags in the created hierarchy are selected to be included in the tag cloud. To the extent that the tag cloud can accommodate additional tags, the most popular non-root tags can also be included in the tag cloud. In one embodiment, the tag cloud is constructed as a set cover-based tag cloud by iteratively selecting an existing tag that provides the largest resource coverage and adding that tag to the tag cloud. This tag and the covered resources are removed from consideration, and the tag associated with the remaining resources that has the next largest resource coverage is selected, added to the cloud and removed from consideration.

This process is repeated iteratively until the total number of selected tags equals the fixed maximum size of the tag cloud.

Examples

Experiments were conducted using the del.icio.us bookmark information, which is publicly available online. The collected information included the date and time of creation of the bookmarks, the creator's user ID, the resource (URL) that each bookmark refers to and the list of tags assigned to the bookmark. The data were retrieved at random interval from the del.icio.us list of recent bookmarks until the most popular tags from the data set converged to the list of the most popular tags from del.icio.us.

The bookmarks information was preprocessed in order to improve the quality of the tags. For example, some creators specified the tags as a comma-separated list of words, which in the del.icio.us database is represented as a single word with URL-encoded commas. The preprocessing tool detected the occurrence of such words and split them into individual tags as originally intended by the creators. The tool also searched for similarities between tags, such as singular and plural forms, or tags that differ only through the presence of quotation marks or punctuation characters. In such case, the tool substituted the tags with their most popular representations. The processed data contained 4850214 bookmarks, 698221 creators and 19887 distinct resources. The data set contained a total of 287101 tags, 212282 of which were used by a single creator.

The resources were on the averaged book-marked 243 times. The distribution of the number of bookmarks per resources exhibited a heavy tail behavior. One third of the resources were bookmarked by less than 25 creators, another third by 25 to 100 creators and the last third by more than 100 creators. Some of the tags were probably only meaningful to their creators and thus of little interest to the broader community. Those tags were eliminated from the set of tags. By inspection on a sample of tags, the popularity metric based on the number of creators provided the best indicator for the quality of the tag. In particular, tags used by more than 75 different creators were meaningful to the larger community, and only those tags were considered in the experiments, reducing the number of tags under consideration to 5282 out of the 287101 tags initially collected from del.icio.us. This resulted in a related reduction to 19735 of the number of resources that can be reached by the remaining tags.

Using the cleaned sets of tags and resources, tag hierarchies were learned using the algorithm of the present invention. A factor that influenced the hierarchies was the value of the conditional probability threshold used in detecting sub-tag relationships. The learned hierarchies were in the form of a set of connected components, where each component had one or more roots. Table 1 shows how the hierarchies depend on the conditional probability threshold.

TABLE 1

Effect of minimum conditional probability threshold.

| Cond. prob. Threshold | # Roots | # Components | Min Connected Component Size | Max Connected Component Size | Avg Connected Component Size | Max Depth | Avg Depth |
|---|---|---|---|---|---|---|---|
| 0.6 | 40 | 10 | 3 | 4556 | 460.5 | 5 | 1.464 |
| 0.7 | 170 | 34 | 3 | 3206 | 126.235 | 4 | 1.111 |
| 0.8 | 316 | 62 | 3 | 1834 | 54.97 | 2 | 1.095 |
| 0.9 | 316 | 88 | 3 | 560 | 22.034 | 2 | 1.002 |

As the threshold increased, more sub-tag relationships were discovered, and the number of connected components decreased while the size of the components increased.

Figure 2:
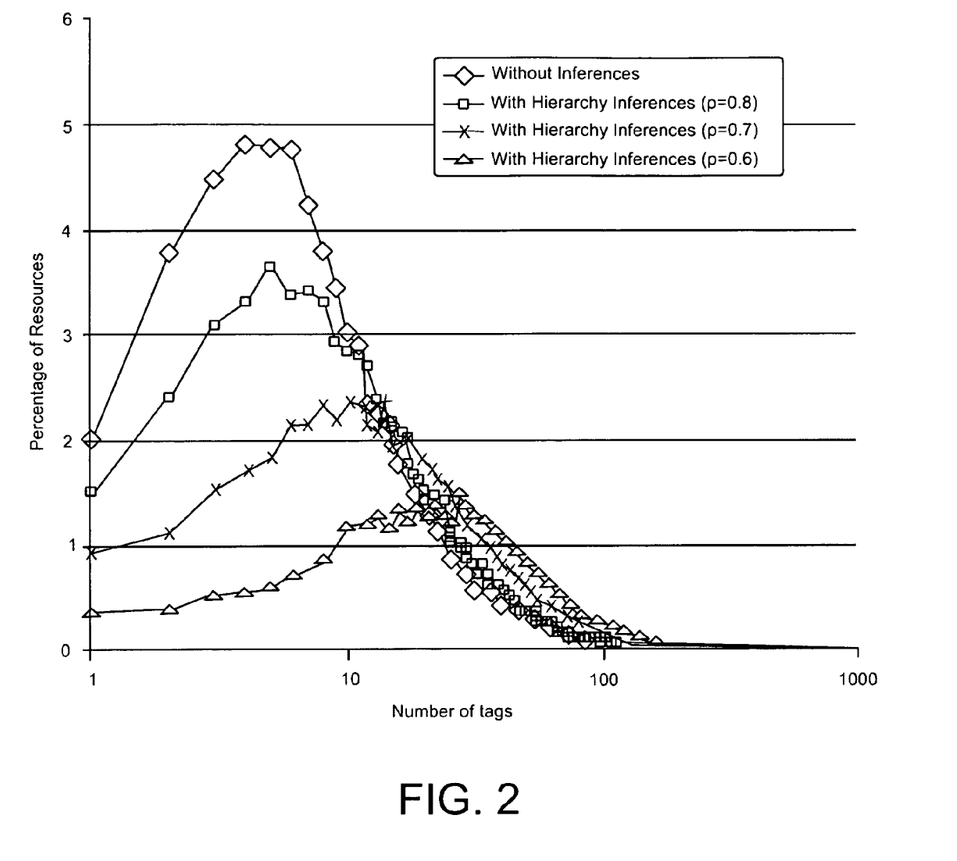
FIG. 2 is a graph illustrating the number of tags versus the percentage of resources for various correlation probabilities.

An important use of tag hierarchies is in enhancing the annotations of resources by adding additional tags to the annotations based on sub-tag relationships. This is particularly useful when the resource is poorly annotated, for example in the case of new resources that have been recently added to the system. This allows these poorly annotated resources to be discovered more easily since their annotation set grows. FIG. 2 shows how the percentage of resources that are annotated with a certain number of tags changes when inferences based on the tag hierarchies are considered. For example, without any inferences, nearly 2% of the resources are associated with just a single tag. This falls to less than 0.5% when considering tag hierarchies that have been learned with a conditional probability threshold of 0.6. More generally, the use of reasoning helps in associating additional tags with resources that have less than 100 tags. The effect is less noticeable for resources that have over a 100 tags, since the tag distribution in these resources are more or less stable. In addition, as the conditional probability threshold decreases from 0.8 to 0.6, the percentage of resources with only a few tags decreases, since more sub-tag relationships are discovered with decreasing thresholds. In another experiment, the accuracy of tag inferencing was measured. Ten URLs that had at least one inferred tag were randomly selected. For each of the URLs, the website was manually inspected, and the inferred tags were separated into 3 categories: relevant, irrelevant and borderline. The borderline category was used to count tags that have very broad or subjective semantics, for example "resources", "work", "useful" or "interesting". This category also included tags added by various software, e.g., "imported", "firefox" and "safarLexport". Such tags are universally applicable, and, therefore, it was determined to be unfair to count these tags as irrelevant. The averaged results are presented in the table below and include the improvement factor, and the percentage of inferred tags in each of the three categories.

| Threshold | Improvement | Relevant | Borderline | Irrelevant |
|---|---|---|---|---|
| 0.6 | 296% | 39% | 27% | 34% |
| 0.7 | 203% | 39% | 26% | 35% |
| 0.8 | 150% | 56% | 36% | 8% |

As the threshold increased, the percentage of added irrelevant tags decreased. In addition, the percentage of relevant tags increased from 39% to 56%, but the ratio of relevant inferences to the original number of tags decreased from 76% to 28%. With higher thresholds, tag inferencing makes less errors, but also adds less value. With all thresholds, approximately a third of inferred tags are borderline tags that in general are not useful in searching. The biggest success of tag inferencing was 100% relevant tags for an article about Jewish desserts, originally tagged with "baking" and "cooking". The article was automatically tagged by "food" and "recipes". The biggest failure, with 71% of inferred tags being irrelevant, was the author portal of blogger.com website, which originally was tagged with 189 different tags, as diverse as "lectures", "heroes", "politics" and "romance". As a result, the 35 inferred tags included tags such as "cinema", "tutorial", "download" and others, which were not relevant as well.

In general, with increased recall, precision may decrease. The effects of tag inference on search precision were measured by comparing how many of 10 randomly selected resources tagged by a fixed tag were relevant. The tags used in this experiment were "community" (tagging approximately 5% of all resources) and "magazine" (2.5% of all resources). For each tag, before incorporating the effects of reasoning, 8 of 10 randomly selected tagged resources were relevant. After reasoning, with a 0.8 conditional probability threshold, between 10% and 15% new URLs were added to the original set, of which 50% were relevant in case of "magazine", and 70% were relevant in the case of "community". These results show that the resource search precision after reasoning is close to the precision in the unimproved set. By studying the inferred tag hierarchy, it was discovered that all subtags of "magazine" were valid abbreviations or translations. However, many resources associated with the sub-tags of "magazine" were not relevant. Hence the low precision result obtained for "magazine" is explained by poor precision of manual tagging associated with the subtags.

The recall of the tag clouds generated using the algorithms of the present invention were measured and compared to the original tag clouds. The tag cloud contained n tags, where n varied from 20 to 100. For each n, the recall of the tag clouds generated using the original popularity-based, the root-based and the set-cover method were compared. For each method, the recalls with and without the use of reasoning to infer additional tags for resources were compared.

In the first experiment, the recall was measured without the use of reasoning, i.e., a resource was counted iff that resource was annotated with a tag that was actually present in the tag cloud. The results of this experiment are shown in Table 2. In the next experiment, shown in Table 3, the recalls were measured with the use of reasoning. A resource was counted iff that resource was annotated with a tag that could be inferred from one of the tags in the tag cloud. The set cover based tag clouds had the highest recall. The use of inferences also helped increasing recall of the tag cloud. The recall with tag hierarchies at a lower threshold was also higher, although this may be associated with lower precision. When the threshold was 0.6, there were only 40 roots in the learned hierarchies. Therefore, results do not exist for n>40 for the root-based tag clouds.

TABLE 2

Recalls for different tag clouds, without use of reasoning, expressed in percents of total number of resources.

| n | Popularity based (%) | Root-based (%) | | | Set-cover based (%) |
|---|---|---|---|---|---|
| | | $\theta = .6$ | $\theta = .7$ | $\theta = .8$ | |
| 20 | 74.76 | 58.08 | 76.99 | 74.66 | 79.91 |
| 40 | 81.72 | 60.54 | 85.03 | 82.52 | 87.88 |
| 60 | 84.41 | — | 88.22 | 86.93 | 91.95 |
| 80 | 87.65 | — | 89.57 | 89.13 | 93.11 |
| 100 | 89.68 | — | 90.62 | 91.21 | 94.36 |

TABLE 3

Recalls for different tag clouds using inferences based on hierarchies, expressed in percents of total number of resources

| n | Popularity Based (%) | | | Root-based (%) | | |
|---|---|---|---|---|---|---|
| | $\theta = .6$ | $\theta = .7$ | $\theta = .8$ | $\theta = .6$ | $\theta = .7$ | $\theta = .8$ |
| 20 | 99.06 | 97 | 89.49 | 99.67 | 97.38 | 89.56 |
| 40 | 99.06 | 97.3 | 91.86 | 99.76 | 98.25 | 92.41 |
| 60 | 99.09 | 97.38 | 92.52 | — | 98.82 | 94.39 |
| 80 | 99.14 | 97.78 | 94.14 | — | 99.02 | 95.32 |
| 100 | 99.14 | 97.94 | 94.96 | — | 99.17 | 96.35 |

| | Set-cover based (%) | | |
|---|---|---|---|
| n | $\theta = .6$ | $\theta = .7$ | $\theta = .8$ |
| 20 | 99.90 | 98.68 | 93.23 |
| 40 | 100 | 99.28 | 96.02 |
| 60 | — | 99.55 | 97.13 |
| 80 | — | 99.70 | 97.76 |
| 100 | — | 99.80 | 98.23 |

Methods and systems in accordance with exemplary embodiments of the present invention can take the form of an entirely hardware embodiment, an entirely software embodiment or an embodiment containing both hardware and software elements. In a preferred embodiment, the invention is implemented in software, which includes but is not limited to firmware, resident software and microcode. In addition, exemplary methods and systems can take the form of a computer program product accessible from a computer-usable or computer-readable medium providing program code for use by or in connection with a computer, logical processing unit or any instruction execution system. For the purposes of this description, a computer-usable or computer-readable medium can be any apparatus that can contain, store, communicate, propagate, or transport the program for use by or in connection with the instruction execution system, apparatus, or device. Suitable computer-usable or computer readable mediums include, but are not limited to, electronic, magnetic, optical, electromagnetic, infrared, or semiconductor systems (or apparatuses or devices) or propagation mediums. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

Suitable data processing systems for storing and/or executing program code include, but are not limited to, at least one processor coupled directly or indirectly to memory elements through a system bus. The memory elements include local memory employed during actual execution of the program code, bulk storage, and cache memories, which provide temporary storage of at least some program code in order to reduce the number of times code must be retrieved from bulk storage during execution. Input/output or I/O devices, including but not limited to keyboards, displays and pointing devices, can be coupled to the system either directly or through intervening I/O controllers. Exemplary embodiments of the methods and systems in accordance with the present invention also include network adapters coupled to the system to enable the data processing system to become coupled to other data processing systems or remote printers or storage devices through intervening private or public networks. Suitable currently available types of network adapters include, but are not limited to, modems, cable modems, DSL modems, Ethernet cards and combinations thereof.

In one embodiment, the present invention is directed to a machine-readable or computer-readable medium containing a machine-executable or computer-executable code that when read by a machine or computer causes the machine or computer to perform a method for improving search and retrieval of resources in a collaborative tagging system in accordance with exemplary embodiments of the present invention and to the computer-executable code itself. The machine-readable or computer-readable code can be any type of code or language capable of being read and executed by the machine or computer and can be expressed in any suitable language or syntax known and available in the art including machine languages, assembler languages, higher level languages, object oriented languages and scripting languages. The computer-executable code can be stored on any suitable storage medium or database, including databases disposed within, in communication with and accessible by computer networks utilized by systems in accordance with the present invention and can be executed on any suitable hardware platform as are known and available in the art including the control systems used to control the presentations of the present invention.

While it is apparent that the illustrative embodiments of the invention disclosed herein fulfill the objectives of the present invention, it is appreciated that numerous modifications and other embodiments may be devised by those skilled in the art. Additionally, feature(s) and/or element(s) from any embodiment may be used singly or in combination with other embodiment(s) and steps or elements from methods in accordance with the present invention can be executed or performed in any suitable order. Therefore, it will be understood that the appended claims are intended to cover all such modifications and embodiments, which would come within the spirit and scope of the present invention.

What is claimed is:

1. A method for improving search and retrieval of resources in a collaborative tagging system, the method comprising:
   identifying, using a computing system in communication with a plurality of computer accessible resources, relationships among a plurality of tags in the collaborative tagging system, the plurality of tags associated by a plurality of users with the plurality of resources, and the relationships among the plurality of tags comprising sub-tag relationships between given pairs of tags based on co-occurrence of those pairs of tags at a given resource and associative semantics, the associative semantics comprising common association between tags in each given pair of tags by the plurality of users;
   using the identified tag relationships based on tag co-occurrence statistics to create a hierarchy of tags, the hierarchy comprising a directed acyclic graph where nodes in the directed acyclic graph comprise tags and edges in the directed acyclic graph comprise the identified tag relationships;
   using the created hierarchy to infer additional tags for resources automatically, to increase a number of tags associated with each resource in order to increase a total number of resources uncovered by a tag-based search of the plurality of resources and to maximize the recall of a tag cloud comprising a plurality of tags; and
   using the tag hierarchies to include inferred tags in the description of each one of the plurality of resources, increasing the weight of top level tags in the hierarchy and removing lower level tags from the tag cloud.

2. The method of claim 1, wherein the step of identifying the relationships further comprises identifying relationships between selected pairs of tags.

3. The method of claim 2, wherein the step of identifying the relationships further comprises calculating a conditional probability for each pair of tags.

4. The method of claim 3, wherein the conditional probability comprises a probability that if a first tag in a given pair of tags has been used to tag a given resource a second tag in the given pair of tags has also been used to tag that resource.

5. The method of claim 3, wherein the step of calculating the conditional probability further comprises determining a ratio, for each pair of tags, of a number of resources tagged by both first and second tags in a given pair to a number of resources tagged by the second tag in the given pair.

6. The method of claim 5, wherein the step of identifying the tag relationships further comprises:
   identifying a threshold value for the conditional probability; and
   identifying, for those given pairs having a conditional probability greater than the identified threshold value, the first tag as a sub-tag of the second tag.

7. The method of claim 1, wherein each node in the directed acyclic graph comprises one of the plurality of tags, and each edge comprises one of the identified tag relationships.

8. The method of claim 7, further comprising:
   creating the directed acyclic graph by:
   identifying any cycles in the directed acyclic graph; and
   collapsing all nodes in each identified cycle into a single node.

9. The method of claim 1, wherein the step of using the created hierarchy further comprises for a given resource having a given associated tag, assigning all super tags in the created hierarchy of the given tag to the given resource.

10. The method of claim 1, wherein the step of using the created hierarchy further comprises using the tag hierarchy to infer additional tags as search terms in the tag-based search.

11. The method of claim 1, wherein the method of using the created hierarchy further comprises selecting root tags in the created hierarchy to be included in the tag cloud.

12. The method of claim 11, wherein the step of using the created hierarchy further comprises including most popular non-root tags to be included in the tag cloud after including all the root tags.

13. A method for improving search and retrieval of resources in a collaborative tagging system, the method comprising:
   identifying, using a computing system in communication with a plurality of computer accessible resources, relationships among a plurality of tags in the collaborative tagging system, the plurality of tags associated by a plurality of users with the plurality of resources, and the relationships among the plurality of tags comprising sub-tag relationships between given pairs of tags based on co-occurrence of those pairs of tags at a given resource and associative semantics, the associative semantics comprising common association between tags in each given pair of tags by the plurality of users;
   using the identified tag relationships based on tag co-occurrence statistics to create a hierarchy of tags, the hierarchy comprising a directed acyclic graph where nodes in the directed acyclic graph comprise tags and edges in the directed acyclic graph comprise the identified tag relationships; and
   using the created hierarchy to infer additional tags for resources automatically, to increase a number of tags associated with each resource in order to increase a total number of resources uncovered by a tag-based search of the plurality of resources and to maximize the recall of a tag cloud comprising a plurality of tags by constructing the tag cloud as a set cover-based tag cloud by iteratively selecting an existing tag comprising a largest resource coverage and removing that existing tag and the covered resources from consideration until a total number of selected tags equals a fixed maximum size of the tag cloud.

14. A method for improving search and retrieval of resources in a collaborative tagging system, the method comprising:
   identifying using a computing system in communication with a plurality of computer accessible resources relationships between pairs of tags selected from a plurality of tags in the collaborative tagging system using sub-tag relationships between the pairs of tags based on co-occurrence of those pairs of tags at a given resource and associative semantics, the associated semantics comprising common association between tags in each given pair of tags by the plurality of users, by calculating a conditional probability for each pair of tags that if a first tag in a given pair of tags has been used to tag a given resource a second tag in the given pair of tags has also been used to tag that resource by determining a ratio, for each pair of tags, of a number of resources tagged by both first and second tags in a given pair to a number of resources tagged by the second tag in the given pair, the plurality of tags associated by a plurality of users with the plurality of resources;
   using the identified tag relationships based on tag co-occurrence statistics to create a hierarchy of tags comprising a directed acyclic graph having a plurality of nodes, each node comprising one of the plurality of tags, and a plurality of edges, each edge comprising one of the identified tag relationships; and
   using the created hierarchy to infer additional tags for resources automatically and to increase a number of tags associated with each resource in order to increase a total number of resources uncovered by a tag-based search of the plurality of resources.

15. The method of claim 14, wherein the step of identifying the tag relationships further comprises:
   identifying a threshold value for the conditional probability; and
   identifying, for those given pairs having a conditional probability greater than the identified threshold value, the first tag as a sub-tag of the second tag.

16. The method of claim 14, wherein the step of using the created hierarchy further comprises for a given resource having a given associated tag, assigning all super tags in the created hierarchy of the given tag to the given resource.

17. The method of claim 14, wherein the step of using the created hierarchy further comprises using the tag hierarchy to infer additional tags as search terms in the tag-based search.

18. The method of claim 14, wherein the step of using the created hierarchy further comprises using the created hierarchy to maximize the recall of a tag cloud comprising a plurality of tags.

19. The method of claim 18, wherein the step of using the created hierarchy further comprises using the tag hierarchies to include inferred tags in the description of each one of the plurality of resources, increasing the weight of top level tags in the hierarchy and removing lower level tags from the tag cloud.

20. The method of claim 18, wherein the method of using the created hierarchy further comprises selecting root tags in the created hierarchy to be included in the tag cloud.

21. The method of claim 18, wherein the step of using the created hierarchy further comprises constructing the tag cloud as a set cover-based tag cloud by iteratively selecting an existing tag comprising a largest resource coverage and removing that existing tag and the covered resources from consideration until a total number of selected tags equals a fixed maximum size of the tag cloud.

* * * * *